No. 640,433. Patented Jan. 2, 1900.
F. R. WHITE.
BICYCLE RACK.
(Application filed May 16, 1899.)
(No Model.)
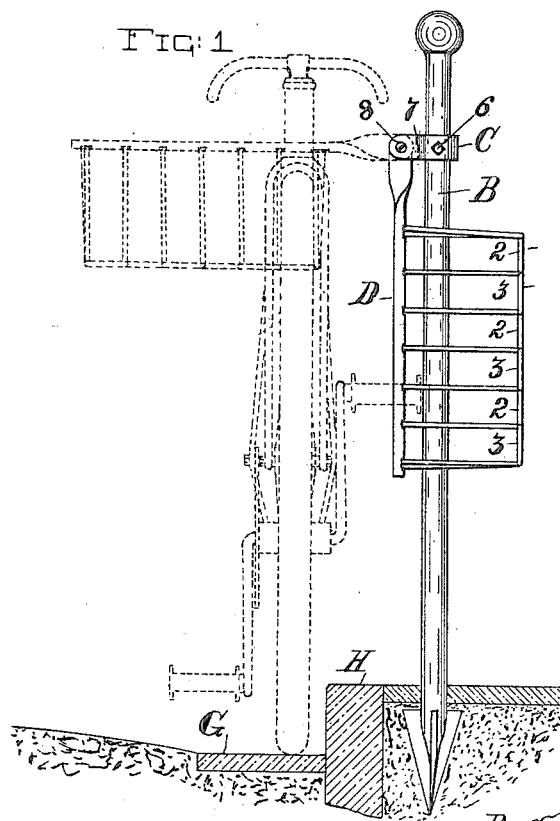
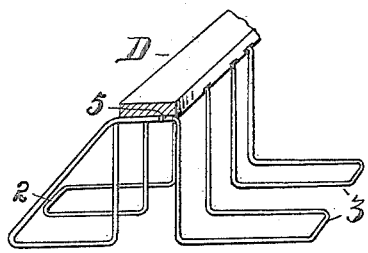
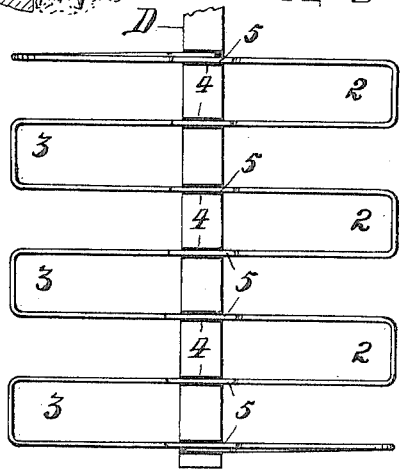
WITNESSES
L. H. Bird.
M. H. Flynn.
INVENTOR
Franklin R. White,
by E. T. Whitney
Attorney.

UNITED STATES PATENT OFFICE.

FRANKLIN R. WHITE, OF WATERBURY, CONNECTICUT.

BICYCLE-RACK.

SPECIFICATION forming part of Letters Patent No. 640,433, dated January 2, 1900.

Application filed May 16, 1899. Serial No. 717,079. (No model.)

*To all whom it may concern:*

Be it known that I, FRANKLIN R. WHITE, a citizen of the United States of America, and a resident of the city of Waterbury, in the county of New Haven and State of Connecticut, have invented certain new and useful Improvements in Bicycle-Racks, of which the following is a specification.

This invention relates to bicycle racks or supports, and more particularly to racks of that class especially adapted for holding a plurality of bicycles side by side in upright position when not in use.

In many cities ordinances have been passed or laws exist prohibiting the obstruction of sidewalks by bicycles, bicycle-racks, &c., and riders of bicycles have had no alternative other than to support their bicycles against the curbing, move them into buildings, or carry a portable bicycle-support with them whereby to support said bicycle in the street; and the principal object of the present invention is to furnish an improved, simplified, and efficient bicycle rack or support of durable and inexpensive construction embodying a gravitative clip or keeper carrier adapted to be shiftably secured to a rigid post or standard located at the edge of the curbing and to be swung outward and upward to a substantially horizontal position beyond the outer edge of the curbing and over the street-gutter in position to receive and support a bicycle or bicycles located outside the curb-line and adapted to be dropped into a substantially vertical position in close relation to the post or standard when not in use and so that the same will not obstruct either the street or sidewalk, and thereby comply with the terms of the ordinances or laws.

In the drawings accompanying and forming part of this specification, Figure 1 is a side elevation of a bicycle-rack embodying my invention, said figure representing the rack in its proper relation to the curb-line of a street and showing the rack-bar or keeper-carrier in full lines in its normal depending position and in dotted lines in a wheel-holding position. Fig. 2 is a cross-sectional perspective view, on a relatively large scale, of the rack-bar and the keepers or clips secured thereto; and Fig. 3 is an under side view of said rack-bar and keepers, said figure showing the series of keepers or clips constructed from a single continuous piece of wire bent to proper form.

Similar characters designate like parts in all the figures of the drawings.

In the preferred construction and organization thereof shown in the accompanying drawings the bicycle rack or support as a whole comprises a post or standard B of suitable construction, an attaching device C, shown secured to said post for adjustment longitudinally thereof, an automatically-gravitative rack-bar or clip-carrier D, pivotally secured to said attaching device, and two sets or two series of bicycle keepers or clips fixedly secured to and extending outwardly from opposite sides, respectively, of said rack-bar, the clips, as 2, of one set preferably alternating with the clips, as 3, of the other set and being disposed at different points, respectively, in the length of said bar in planes intersecting the longitudinal axis thereof, whereby a plurality of bicycles may be supported side by side, some at one side and others at the opposite side of the rack-bar, with their wheels in vertical planes substantially parallel to the pivot on which the rack-bar swings.

I do not desire to limit this invention to the particular construction and organization of parts illustrated in the accompanying drawings, as these are capable of reasonable modification within the purview of this invention.

The clips or keepers 2 and 3, which are fixedly secured to the rack-bar D, are in the form thereof shown in the accompanying drawings preferably constructed from a single continuous piece of spring-wire bent at successive predetermined points in the length thereof to form a series of oppositely-disposed preferably L-shaped loops, which loops are disposed in parallelism at right angles to and intersecting the longitudinal axis of said bar and constitute the clips proper, 2 and 3, the opposing inner bars of adjacent loops of each set being relatively separated a distance slightly less than the diameter of a pneumatic-tired bicycle-wheel rim, whereby said tire will be yieldingly engaged by opposing loops or clips when the wheel is seated in the space between said two adjacent loops, as will be readily understood by reference to Fig. 1 of the drawings.

As a convenient means for securing the clips or loops in place transversely of the rack-bar said rack-bar will have formed in the inner or under face thereof a series of equidistantly-disposed transverse grooves 4 of sufficient width to receive the cross-bars 5, which connect oppositely-disposed loops 2 and 3 of opposite sets together, the bars 5 being secured in said grooves 4 in any suitable manner.

The attaching device C is shown in the accompanying drawings as a split sleeve or collar embracing the post B and adjustably secured thereto by means of a set-screw 6, said collar having outwardly-extended lugs 7, (one only of which is shown in the accompanying drawings,) between which the inner end of the rack-bar is pivoted, the pivot-point 8 of the rack-bar being so disposed with relation to the post that when the rack-bar is in its normal depending position the same will lie in close proximity to the adjacent face of said post.

The clips or keepers 2 and 3 of opposing sets are so constructed and so disposed with relation to each other transversely of the longitudinal axis of the rack-bar that a space is formed longitudinally of said rack-bar between the inner ends of opposing sets to receive the post B and allow the inner adjacent ends of the opposing clips to straddle the post when the rack-bar is in a depending position—that is to say, the two sets of clips are so constructed and disposed with relation to each other that one set of clips 2 will be disposed at one side the post B and the other set of clips 3 will be wholly disposed at the opposite side of said post when the rack-bar is in the position shown in Fig. 1, so that the clip and rack-bar will not obstruct either the street or sidewalk to any extent when in the position shown in said figure.

By disposing the clips 2 and 3 at right angles to and in planes intersecting the longitudinal axis of the rack-bar and so placing the post B and connecting rack-bar D that when said rack-bar is swung upward into the position shown in dotted lines in Fig. 1, over the gutter G, (the post being secured in the ground just inside the curb H, as shown in said figure,) the opposing sets of clips or keepers 2 and 3 will be in position to engage and hold one or more wheels when said wheels are disposed in parallelism, or substantially so, with the outer edge of the curb.

When it is desired to support a wheel, as shown in dotted lines in Fig. 1, assuming the parts of the bicycle-rack to be in full-line positions shown in said figure, it is simply necessary to lift the rack-bar and clips secured thereto to the position shown in dotted lines in said figure and force the tire or rim of the bicycle-wheel between two adjacent clips of one set, where it will be held in place against transverse or longitudinal movement. On the removal of the wheel from between the clips the rack-bar will immediately drop to the position shown in full lines in said figure, out of the way.

By constructing and disposing the clips as shown most clearly in Figs. 2 and 3 a series of bicycles may be supported side by side, some being held between the clips of one set on one side of the rack-bar and others being held between the clips of the other set at the opposite side of said rack-bar, as will be readily understood from the drawings. The rack-bar D is pivotally connected with the vertical post B in such manner that it will normally depend with its longitudinal axis in the plane of the longitudinal axis of the post and substantially parallel thereto, and the clips 2 and 3 are so fixed to said rack-bar at different points in the length thereof that when the rack-bar is in its normal depending position the clips of each set will be in superposed relation and disposed transversely of the longitudinal axis of the post, all of said clips being fixedly secured to the rack-bar and having movements bodily with said rack-bar in relatively concentric arcs about a common center when shifted from the position shown in full lines to that shown in dotted lines, or vice versa, in Fig. 1 of the drawings.

I claim—

1. A bicycle-rack comprising a post or upright; an attaching device adjustably secured to said post; a rack-bar connected to said attaching device for swinging movement in a vertical plane; two sets of alternately-disposed resilient clips or keepers fixed to said rack-bar and extending outward from opposite sides respectively thereof in planes intersecting the longitudinal axis of said bar, the clips of one set being so disposed with respect to the clips of the adjacent set, that a space is formed longitudinally of said bar between the inner adjacent ends of the two sets of clips to receive the post when the rack-bar is in a depending position, substantially as described.

2. A bicycle-rack comprehending a vertical post; an automatically-gravitative rack-bar pivotally connected to said post for swinging movement in a vertical plane from a normally depending, or vertical, position parallel to said post, to a horizontal position at right angles to said post; and a series of integral resilient clips fixedly secured to said bar and extending outward from opposite side faces thereof in alternating arrangement, and in planes intersecting the longitudinal axes of said bar, whereby on a swinging movement of the bar, the clips will have a bodily movement about a common center.

3. A bicycle-rack including an attaching device; a rack-bar pivotally connected at its inner end to said attaching device and having in one face thereof a series of transverse grooves; and a series of transversely-disposed spring-wire clips or keepers having connecting-bars secured in said grooves.

4. A bicycle-rack including a rack-bar supported for swinging movement in a vertical plane; and two sets of alternately-disposed resilient clips or keepers fixed to said rack-bar and extending outward from opposite sides respectively thereof in planes intersecting the longitudinal axis of said bar, the clips of one set being so disposed with respect to the clips of the adjacent set, that a space is formed longitudinally of said bar between the inner adjacent ends of the two sets of clips.

Signed by me at Hartford, Hartford county, Connecticut, this 12th day of May, 1899.

FRANKLIN R. WHITE.

Witnesses:
E. C. WHITNEY,
B. N. PARKER.